United States Patent [19]

Coindet et al.

[11] 4,218,173
[45] Aug. 19, 1980

[54] ROBOTS

[75] Inventors: Jacques Coindet, Valence; Paul Romand, Bourg de Peage, both of France

[73] Assignee: Crouzet, Paris, France

[21] Appl. No.: 923,951

[22] Filed: Jul. 12, 1978

[30] Foreign Application Priority Data

Jul. 19, 1977 [FR] France ............................... 77 22332

[51] Int. Cl.² .............................................. B66C 1/04
[52] U.S. Cl. .................................. 414/730; 414/732; 414/737; 414/738
[58] Field of Search ............... 414/729, 730, 732, 737, 414/738, 751; 33/30 E

[56] References Cited

U.S. PATENT DOCUMENTS 3,575,301   4/1971   Panissidi ............................... 414/753

Primary Examiner—L. J. Paperner
Assistant Examiner—George F. Abraham
Attorney, Agent, or Firm—Jacobs & Jacobs

[57] ABSTRACT

A robot comprising a chain of members connected in pairs and mobile with respect to one another under the action of drive device controlled by a computer, each of the members being operative to drive a terminal member of the chain in a movement determined by a monitoring device controlling the computer, a single motor for selectively actuating, via a selection device controlled by the computer, each of the mobile members separately, and a single monitoring coder for selectively determining the movement of the mobile members.

4 Claims, 2 Drawing Figures

ROBOTS

BACKGROUND OF THE INVENTION

The present invention relates to improvements in robots.

Numerous branches of activity currently employ robots for performing certain functions, either because the function to be performed is repetitive and it may very easily be entrusted to an automatic device, or because the function must be performed in a medium hostile or inaccessible to man (manipulations of dangerous products, radioactive products, taking of samples from a planet). Each robot is most often intended to solve a particular problem which corresponds to a specific and unique case, and in the present state of technology, a solution is found for all the particular problems.

Robots are generally constituted by a chain of a plurality of members articulated to one another, each point of articulation comprising drive means for controlling the relative movement of two members and monitoring means, for example a coder. A central computer receives the data from the coders and controls the drive means to cause the robot to make the desired gestures.

This arrangement has the drawback of making the mobile units heavy. This is a minor disadvantage for high-power robots intended for displacing heavy loads, the weight of the drive means remaining negligible with respect to the load displaced. On the other hand, it is a serious drawback for small robots, intended for manipulating pieces weighing a few grams within small places. The weight and dimensions of the drive means and the coders are then disproportionate with respect to those of the loads displaced and often to the place available.

SUMMARY OF THE INVENTION

It is an object of the present invention to overcome these drawbacks.

To this end, the invention relates to a robot comprising a single motor for selectively actuating several members mobile with respect to one another, and a single coder for selectively monitoring the movements of the mobile members.

The invention also relates to a robot in which each mobile member comprises, on the one hand, resilient means for returning into rest position and, on the other hand, means for immobilizing a mobile member with respect to the other member to which the first is connected. The locking means may be controlled by the computer so as to lock all the mobile members with the exception of the one whose relative position is to be varied, under the action of the motor and as a function of the program, with respect to the other mobile member to which it is connected.

In an advantageous embodiment of the robot according to the invention, the means for returning all the mobile members into rest position are constituted by a single torque motor.

BRIEF DESCRIPTION OF THE DRAWINGS

The invention will be more readily understood on reading the following description with reference to the accompanying drawings, in which.

DETAILED DESCRIPTION OF THE INVENTION

Figure 1:
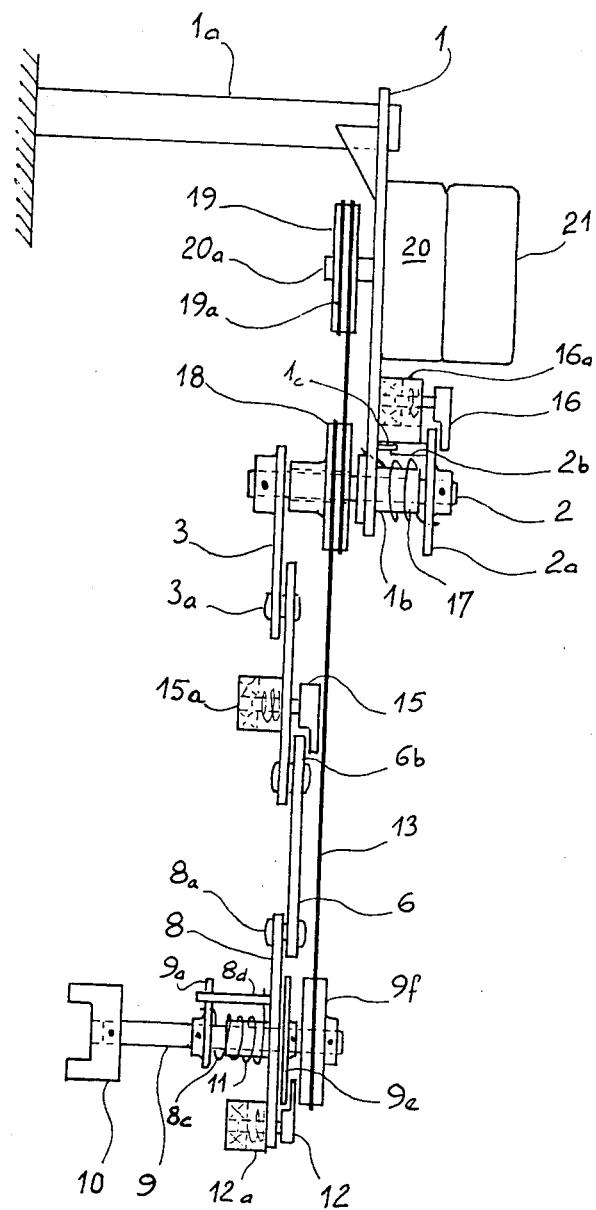
FIG. 1 schematically shows, in elevation, an embodiment of the robot of the invention intended for manipulating pieces.
Figure 2:
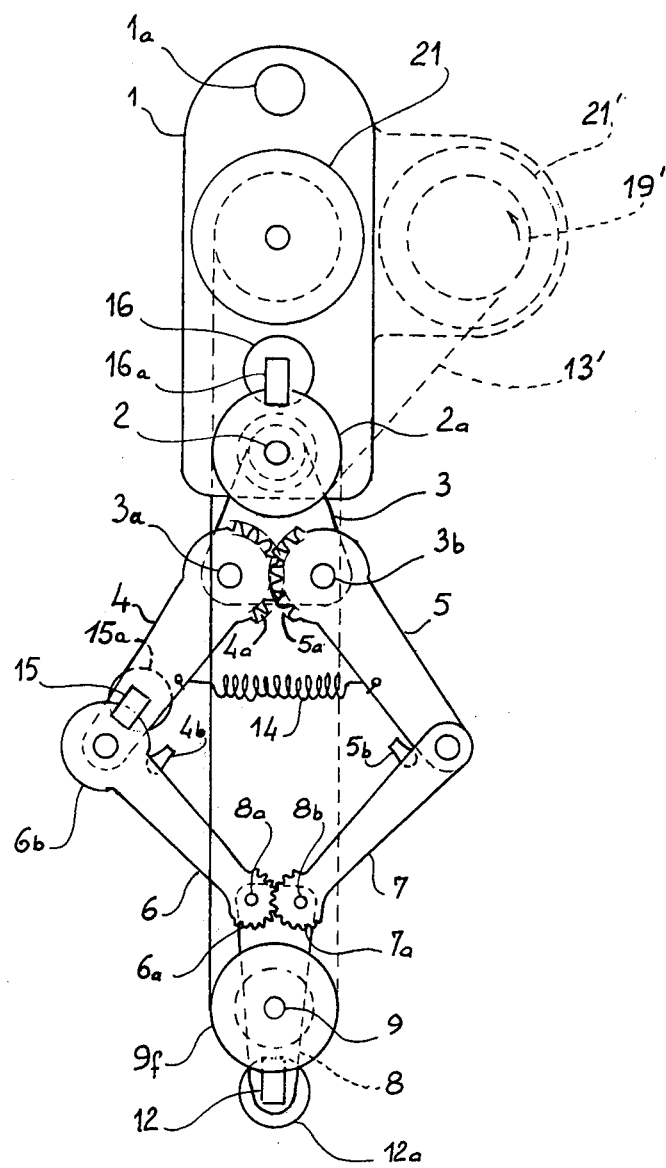
FIG. 2 shows in plan view from above, the robot of FIG. 1.

Referring now to the drawings, FIGS. 1 and 2 show a robot for performing a voluntarily limited series of operations. A member for gripping articles may be oriented on itself by pivoting about a vertical axis and be displaced from a point defined by its polar co-ordinates to another point of different polar co-ordinates.

A flat horizontal support 1 fixed to the ground by a vertical column 1a constitutes the frame of the robot.

The support 1 carries a vertical shaft 2 guided in a bearing 1b. At the lower end of the shaft 2 is fixed a plate 3 on which are pivoted two arms 4 and 5 respectively at studs 3a and 3b. Two other arms 6 and 7 are pivoted by one of their ends, respectively on arms 4 and 5 and, by the other of their ends, respectively at studs 8a and 8b of a plate 8.

A bearing 8c is fixed to the plate 8, which bearing supports a vertical shaft 9, at the lower end of which is fixed the article-gripping member, for example an electromagnet 10.

The two arms 4 and 5 comprise toothed sectors 4a and 5a meshing each other, and the two arms 6 and 7 comprise toothed sectors 6a and 7a meshing each other. Thus a deformable parallelogram is made, of which the diagonal passing through shafts 9 and 2 is rotatable with shaft 2, and materialises a radius vector of variable length $\rho$.

The shaft 9, of which the variable distance to shaft 2 is $\rho$, and which may be driven in rotation through an angle $\phi$ with respect to a straight line-origin passing through shaft 2, therefore has a position, in a horizontal plan, which may be defined by polar co-ordinates $(\rho, \phi)$ having shaft 2 as origin.

The shaft 9 is rotatable about its axis, and is resiliently returned by a spring 11 in anticlockwise direction to a position, origin of the angles of rotation $\alpha$ of the shaft 9 about its axis in which a pin 9a transversely fixed to the shaft 9 abuts against a pin 8d fitted in the plate 8 parallel to shaft 9. The spring 11, disposed around the bearing 8c, is fixed by its two ends to pins 9a and 8d.

The shaft 9 is rotatable with a disc 9e which rests flat on the plate 8. A brake shoe 12, controlled by an electromagnet coil 12a, enables the shaft 9 to be braked and immobilised in any angular position.

The shaft 9 is also rotatable with a drum 9f on which is attached, over more than one turn, the end of a cable 13, so that a pull on the cable 13 brings about the rotation of the shaft 9 inclockwise direction, against the action of the return spring 11, if the brake 12 is not applied.

A spring 14 returns the arms 4 and 5 towards each other to a position where two stops 4b, 5b, respectively fixed on the arms 6 and 7, come into contact. Thus a reference length $\rho_r$ is defined for the distance between shafts 2 and 9. At least one of the articulations of the parallelogram 4,5,6,7 (in FIG. 2, the articulation of arms 4 and 6) may be locked by a brake shoe 15 to set the value of $\rho$. The arm 6 is enlarged around the pivot axis of arms 4, 6 to form a disc 6b which the brake shoe 15, controlled by an electromagnet coil 15a, may lock against the arm 4.

The shaft 2 is rigid with a disc 2a which may be braked and locked in any angular position $\phi$ by means of a brake shoe 16 controlled by an electromagnet 16a.

A spring 17 resiliently returns the shaft in anticlockwise direction to a defined position, origin of the angles φ, in which a pin 2b secured to the disc 2a, engages a pin 1c secured to the support 1.

The shaft 2 carries a drum 18, mounted idle, located in the same horizontal plane as drum 9f, and on which the cable 13 makes at least one complete turn.

A drive drum 19, disposed in the same horizontal plane as the drums 9f and 18, is mounted on the shaft 20a of a monitoring coder 20 supported by the support 1. The coder 20, of the so-called pulse type which emits a number of pulses proportional to the desired angle of rotation (φ or α) is controlled by a gear-down motor 21. The drum 19 receives the cable 13 which makes several turns therearound and of which the end is fixed to the element 19a.

The robot functions as follows:

Orientation of the article-gripping member 10:

The brakes 15-15a and 16-16a being applied, the brake 12-12a being released, and the motor 21 being supplied to rotate in clockwise direction, the cable 13 is wound on the drum 19 and drives the idle drum 18 and the drum 9f. The member 10 is driven in clockwise direction through an angle α which is a function of the number of pulses emitted by the coder 20 and of the ratio of the diameters of the drums 19 and 9f.

From a position other than the rest position (α=0), a rotation of the motor 21 in anticlockwise direction causes the angle α to vary under the action of the return spring 11, in anticlockwise direction by a quantity proportional to the number of pulses emitted by the coder 20.

Variation of the radius vector ρ:

The brakes 12-12a and 16-16a being applied, the brake 15-15a being released, and the motor 21 being supplied to rotate in clockwise direction, the pull of the cable 13 obliges the parallelogram 4,5,6,7 to deform to shorten the length ρ between the shaft 9 and the shaft 2, the variation of lengths of ρ being a linear function of the number of pulses emitted by the coder 20 during rotation.

From a position other than the rest position ($\rho = \rho_r$), the rotation of the motor 21 in anticlockwise direction provokes, under the action of the spring 14, an extension of ρ, which is a linear function of the number of pulses emitted by the coder 20.

Variation of the polar angle φ:

The brakes 12-12a and 15-15a being applied, the brake 16-16a being released, and the motor 21 being supplied to rotate in clockwise direction, the whole of the parallelogram 4,5,6,7 is driven in rotation in clockwise direction through an angle φ which is a function of the number of pulses emitted by the coder 20 and the ratio of the diameters of the drums 19 and 18.

From a position other than the position of origin (φ=0), if the motor 21 is supplied to rotate in anticlockwise direction, the angle φ varies under the action of the return spring 17 in anticlockwise direction, the rotation being a linear function of the number of pulses emitted by the coder 20.

It is clearly seen that the robot of the invention enables the shaft 9 and the member 10 to be brought successively to all the points of which the polar co-ordinates have been programmed in advance or of which the polar co-ordinates are elaborated by a computer. Moreover, at each point defined by its polar co-ordinates, the member 10 may be oriented to grip a piece which is in a given position or to deposit a piece in a desired orientation.

Of course, only one embodiment of the robot of the invention has been described and illustrated, but the present invention covers numerous modifications.

The parallelogram 4,5,6,7 may thus be replaced by a slideway rigid with the shaft 2 and by a slide bearing the shaft 9.

In another modification, the return springs 11 and 17 may be replaced by a cable 13' identical to cable 13 but winding in opposite direction on drums 9f and 18 and terminating at a drum 19' driven by a torque motor 21' supplied to rotate in anticlockwise direction. This arrangement, when the motor 21 rotates in clockwise direction, makes it possible to cut off the supply of the torque motor 21' so that the motor 21 has no return torque to overcome.

Elements 13', 19', 21' are shown schematically in broken lines in FIG. 2.

In a still further modification, the motor 21 and coder 20 may by replaced by a step-by-step motor which receives for each successive operation, rotation α of the shaft 9, variation of ρ, rotation φ of the shaft 2, the number, set by the program, of pulses emitted by a clock.

To simplify the specification, the description has been voluntarily limited to a device mobile in two dimensions, but it is obvious that the invention is applicable to a device mobile in more than two dimensions.

What we claim is:

1. A robot comprising a chain of members connected in pairs and mobile with respect to one another and having a terminal member, a single motor and a selection means adapted to be controlled by a computer and a single monitoring coder whereby the motor drives selectively, by means of the selection means, each of the mobile members separately in a movement, for driving the terminal member of the chain in a determined movement, biasing means being provided for biasing each of said mobile members to rest position defined by the contact of two abutments, the motor acts positively in one direction to selectively actuate each of said mobile members against the action of said biasing means, and said members comprise a first plate rotatably mounted on a first shaft parallel to the axis of the motor, a second plate secured to a second shaft parallel to the axis of the motor, a deformable parallelogram connecting the two plates, a biasing member biasing the parallelogram to its rest position, a first drive drum fixed on the axis of the motor, a second drum mounted idle on the shaft of the first plate, a third drum fixed on the shaft of the second plate, a flexible drive cable fixed, at one of its ends, to said third drum, while being wound over at least one turn, on said second drum, and fixed, at the other of its ends, on said first drum, while being wound over several turns, the winding of the cable being such that a pull exerted on this cable by said first drive drum selectively provokes, via said selection means, either the rotation of said first shaft and therefore of said first plate, or that of said second shaft, or the deformation of said parallelogram, against the action of said biasing member.

2. A robot according to claim 1, wherein said monitoring coder is a pulsed coder which emits a number of pulses which is a linear function of the angle of rotation of one of said shafts of said plates or of the shortening of the distance between said shafts provoked by the deformation of said parallelogram.

3. A robot according to claim 2, wherein said biasing means comprise a single torque motor, a drum fixed on the shaft of said torque motor, and a flexible biasing cable winding on said drum associated with the torque motor and on said second and third drums, in the opposite direction from that of said drive cable.

4. A robot according to claim 1, wherein said biasing means comprise a single torque motor, a drum fixed on the shaft of said torque motor, and a flexible biasing cable winding on said drum associated with the torque motor and on said second and third drums, in the opposite direction from that of said drive cable.

* * * * *